(12) United States Patent
Sibley, Jr.

(10) Patent No.: US 6,179,316 B1
(45) Date of Patent: *Jan. 30, 2001

(54) STEPPED LOCK PLUNGER FIFTH WHEEL HITCH

(75) Inventor: Richard J. Sibley, Jr., Holland, MI (US)

(73) Assignee: Holland Hitch Company, Holland, MI (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/257,779
(22) Filed: Feb. 25, 1999
(51) Int. Cl.[7] .................................................. B62D 53/12
(52) U.S. Cl. .......................................... 280/434; 280/433
(58) Field of Search ................................... 280/433, 434, 280/435, 436

(56) References Cited

U.S. PATENT DOCUMENTS

| | | | |
|---|---|---|---|
| 1,592,832 | 7/1926 | La Londe | 280/434 |
| 1,981,233 | 11/1934 | Harris | 280/434 |
| 2,610,069 | 9/1952 | Ketel | 280/33.05 |
| 2,833,558 | 5/1958 | Fenster | 280/434 |
| 2,833,559 | 5/1958 | Miner | 280/434 |
| 2,838,326 | 6/1958 | Georgi | 280/434 |
| 2,861,818 | 11/1958 | Kayler et al. | 280/434 |
| 3,002,767 | 10/1961 | Gresko | 280/434 |
| 3,056,612 | 10/1962 | Slaven | 280/434 |
| 3,063,738 | 11/1962 | Becker | 280/434 |
| 3,148,893 | 9/1964 | Cole et al. | 280/434 |
| 3,318,616 | 5/1967 | Fontaine et al. | 280/434 |
| 3,525,538 | 8/1970 | Fujioka et al. | 280/434 |
| 3,600,006 | 8/1971 | Slaven | 280/434 |
| 3,647,248 | 3/1972 | Ferris et al. | 287/20.5 R |
| 3,830,523 | 8/1974 | Morichetto | 280/434 |
| 3,844,584 | 10/1974 | Fontaine | 280/434 |
| 4,394,030 | 7/1983 | Inoue | 280/434 |
| 4,447,070 | 5/1984 | Inoue | 280/434 |
| 4,566,715 | 1/1986 | Buckley | 280/434 |
| 4,659,101 | 4/1987 | Buckley | 280/434 |
| 4,826,199 | 5/1989 | Chambers | 280/434 |
| 4,871,182 | 10/1989 | Altherr et al. | 280/434 |
| 5,028,067 | 7/1991 | Madura | 280/433 |
| 5,257,796 | 11/1993 | Thorwall et al. | 280/434 |
| 5,641,174 | * 6/1997 | Terry et al. | 280/434 |
| 5,876,055 | * 3/1999 | Fontaine | 280/437 |
| 5,988,666 | * 11/1999 | Flater | 280/434 |

* cited by examiner

Primary Examiner—Brian L. Johnson
Assistant Examiner—Daniel Yeagley
(74) Attorney, Agent, or Firm—Price, Heneveld, Cooper, DeWitt & Litton

(57) ABSTRACT

A fifth wheel hitch comprising a bifurcated top plate with a dead-end throat for receiving a cooperative kingpin, a hinged jaw pivotal between a closed position across the throat and an open position clear of the throat, the jaw having a rearward surface for engagement by a locking plunger, a locking plunger shiftable between a retracted unlocking position out of engagement with the jaw and an extended locking position engageable with the jaw, wedge mechanism engaging the locking plunger for adjusting the forward-rearward position of the locking plunger to accommodate wear of the jaw, the jaw rear surface having a first rear surface portion and a second rear surface portion rearwardly offset from the first rear surface portion, the plunger having a first front surface portion and a second front surface portion rearwardly offset from the first front surface portion, the first and second rear surface portions of the jaw being engageable with the respective first and second front surface portions of the plunger in full locking engagement of the locking plunger with the jaw, and the first front surface portion of the plunger being engageable with the second rear surface portion of the jaw if the plunger cannot shift to full locking engagement due to overadjustment of the wedge mechanism.

5 Claims, 4 Drawing Sheets

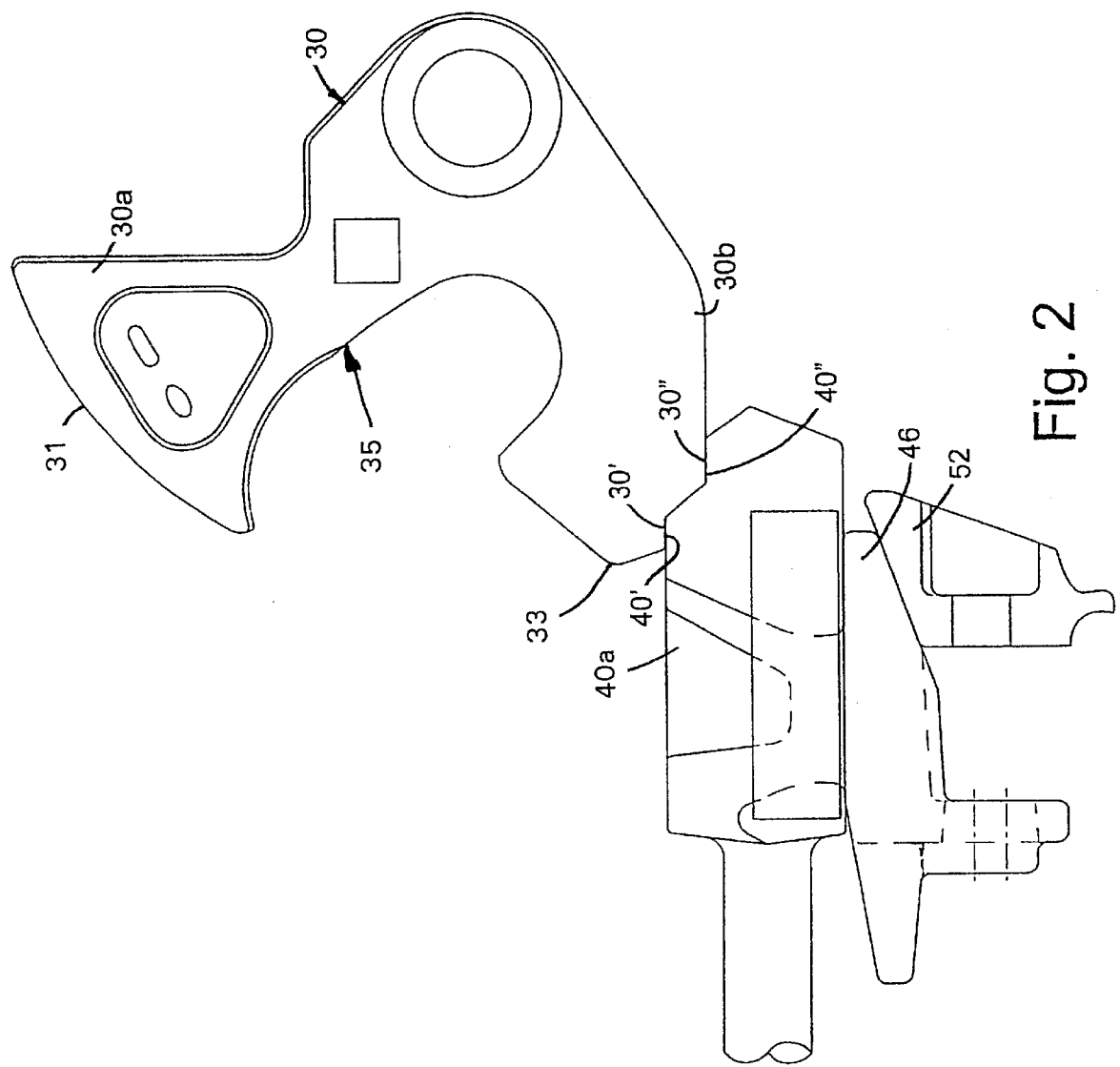

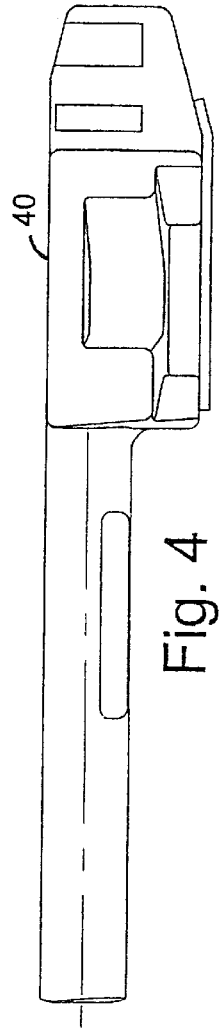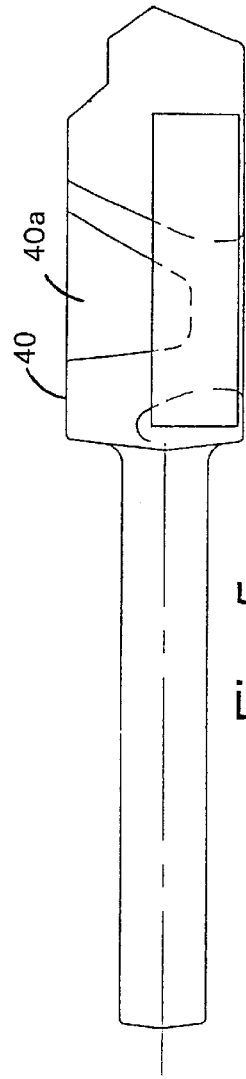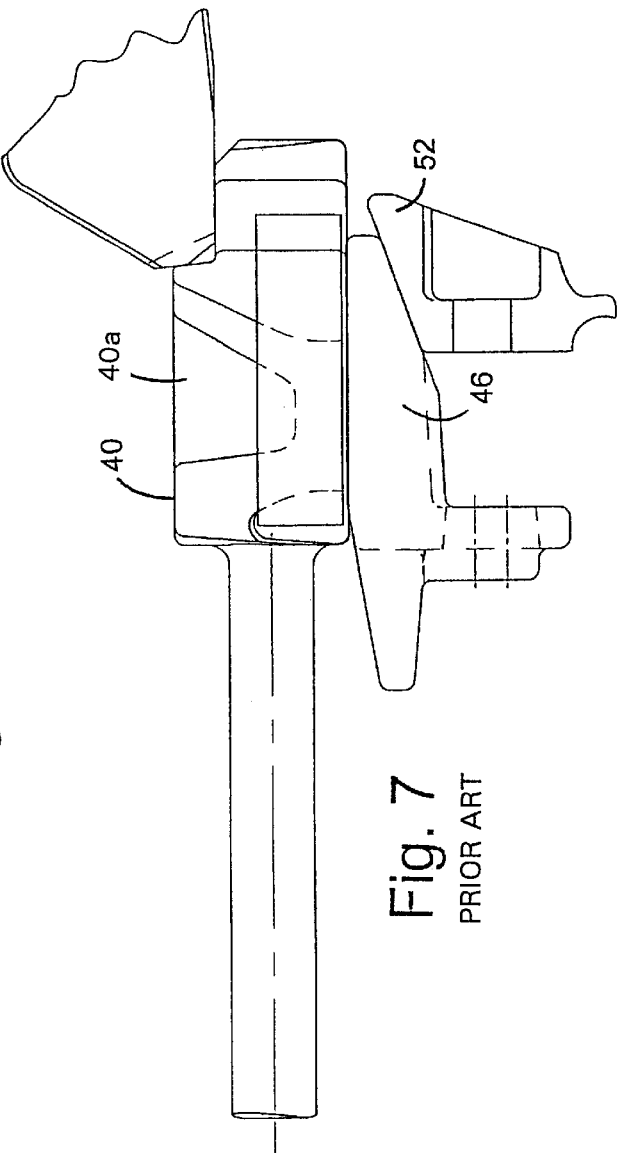
Fig. 4
Fig. 5
Fig. 7
PRIOR ART

STEPPED LOCK PLUNGER FIFTH WHEEL HITCH

BACKGROUND OF THE INVENTION

This invention relates to fifth wheel hitches, and particularly to a lock mechanism for a fifth wheel hitch.

Fifth wheel hitches are primarily employed to connect a semitrailer to a towing truck tractor. Several types of fifth wheel hitches have been developed during the twentieth century. One type of hitch is that sometimes known as the "A" type, shown in Ketel U.S. Pat. No. 2,610,069 and marketed by the assignee herein. The swing jaw of that hitch is locked in place by a spring biased plunger when the jaw is fully closed behind the kingpin. This plunger bears against the locking jaw rear surface when in locked position, to prevent the swing jaw from opening.

During use, hitch components such as the jaw elements eventually become somewhat worn to thereby result in some undesirable clearance or play between the kingpin and the hitch jaws. To keep this clearance and resulting play to a reasonable amount, a double wedge adjustment mechanism has been provided to the market by the assignee herein as part of the hitch assembly. Such an adjustment apparatus is shown, for example, in FIG. 6 herein and in U.S. Pat. No. 5,257,796, incorporated herein by reference. The adjustment apparatus has the forward surface of a fixed wedge bearing against the rearward surface of a laterally movable wedge, the movable wedge being adjustable by a threaded bolt or the like, to bear against the locking plunger rear surface with enough force to move it and hold it in the desired position for accommodating wear of the hitch components. The entire apparatus, including the adjustment mechanism, is initially factory adjusted for proper interfit. When wear occurs over a period of time, the adjustable wedge of the hitch is appropriately adjusted by trained authorized maintenance personnel knowledgeable concerning fifth wheel hitch mechanisms, to take up the slack to the desired clearance.

It has been determined that unauthorized persons might irresponsibly adjust the hitch lock mechanism. If the movable wedge member is not adjusted enough, the connection to the kingpin will still have excess clearance remaining and, while that may be annoying to the driver, it does not present a particular problem. However, if the movable wedge is adjusted too much, the lock plunger will be shifted too far toward the swing jaw. When the swing jaw closes, the plunger will abut against the end of the jaw and not be able to slide behind the jaw to lock it. The driver may believe he has secured the hitch, and begin to drive the tractor forwardly, but the hitch jaw will open so the trailer will not be pulled with the tractor and may Another complication that may result during hitching of a truck tractor to a trailer occurs when the driver engages the tractor fifth wheel hitch to the trailer kingpin at too great a speed. This can result in the trailer being bumped rearwardly so the kingpin is not fully within the throat of the hitch. In this condition, the swing jaw cannot fully close so the lock plunger cannot shift behind the swing jaw to lock it. The driver thus must often repeat the coupling attempt.

SUMMARY OF THE INVENTION

An object of this invention is to provide a novel fifth wheel hitch jaw, lock plunger mechanism and wear adjustment mechanism for the lock plunger in combination with a two-step jaw and plunger locking interengagement configuration such that, if the hitch adjustment is irresponsibly adjusted too much, the lock plunger can still engage the jaw sufficiently to hold it in place. It would allow considerable clearance between the kingpin and jaw for excess "play" therebetween, but this can alert the driver to the fact that it is not adjusted properly.

The novel fifth wheel hitch mechanism uses an adjustable wedge mechanism to shift the locking plunger for accommodation of component wear in combination with a plural step, preferably a two-step, front engagement face on the lock plunger and a cooperative, complementary, plural-step rear engagement face of the swing jaw. Thus, if the adjustable wedge mechanism is improperly overly adjusted so that both steps of the jaw and plunger cannot interengage, the first step of the plunger will still engage with the second step of the jaw to retain the jaw closed. If the driver advances the tractor, it will pull the trailer but there will be significant play between the kingpin and the hitch jaws so the driver will be alerted to have trained personnel take steps to optimize the connection.

The two-step locking system also maximizes coupling timing of the hitch. The steps on the lock and on the plunger are set in such a manner that there is preferably about 0.25 inch of kingpin movement left when the plunger first step is engaged to the second step on the jaw. The current system has about 0.04 inch kingpin movement left before the locking plunger engages the jaw of the lock. At higher coupling speeds, the novel two-step locking system is more forgiving than the conventional hitch so that the incidence of coupling is greatly increased.

These and other features, advantages and objects of the present invention will be further understood and appreciated by those skilled in the art by reference to the following specification, claims and appended drawings.

BRIEF DESCRIPTION OF THE DRAWINGS

FIG. 2 is an enlarged, fragmentary, bottom view of the swing jaw, locking plunger and adjustment wedges of this invention;

FIG. 3 is an end elevational view of the swing jaw in FIG. 2;

FIG. 4 is a side elevational view of the front side of the locking plunger in the hitch of FIGS. 1 and 2;

FIG. 5 is a bottom view of the locking plunger and fragmentary components of the swing jaw and adjustment wedges;

FIG. 7 is an enlarged bottom view of the plunger, swing jaw and adjustment wedges of the prior art hitch.

DETAILED DESCRIPTION OF PREFERRED EMBODIMENT

Figure 1:
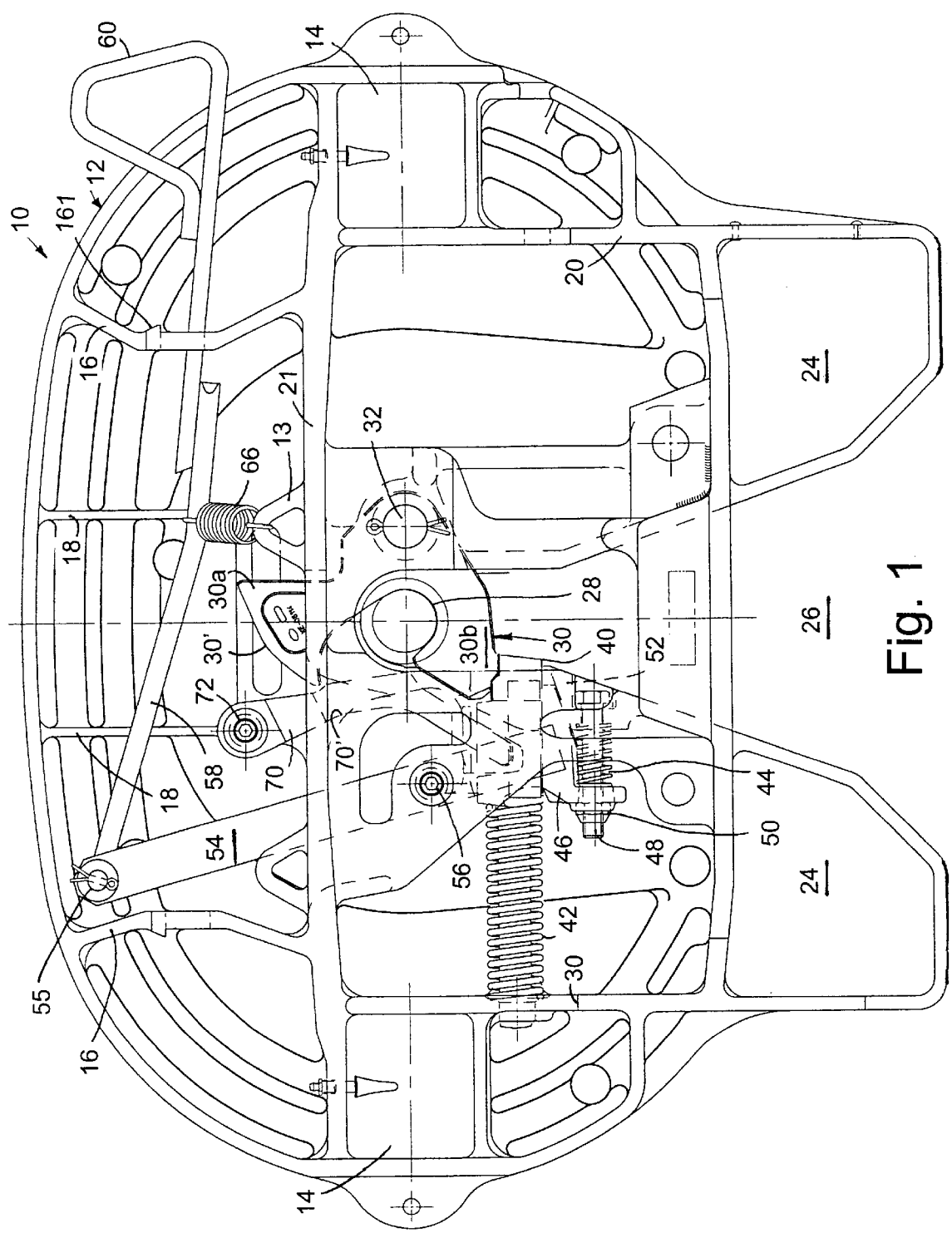
FIG. 1 is a bottom view of a fifth wheel hitch employing this invention.
Figure 6:
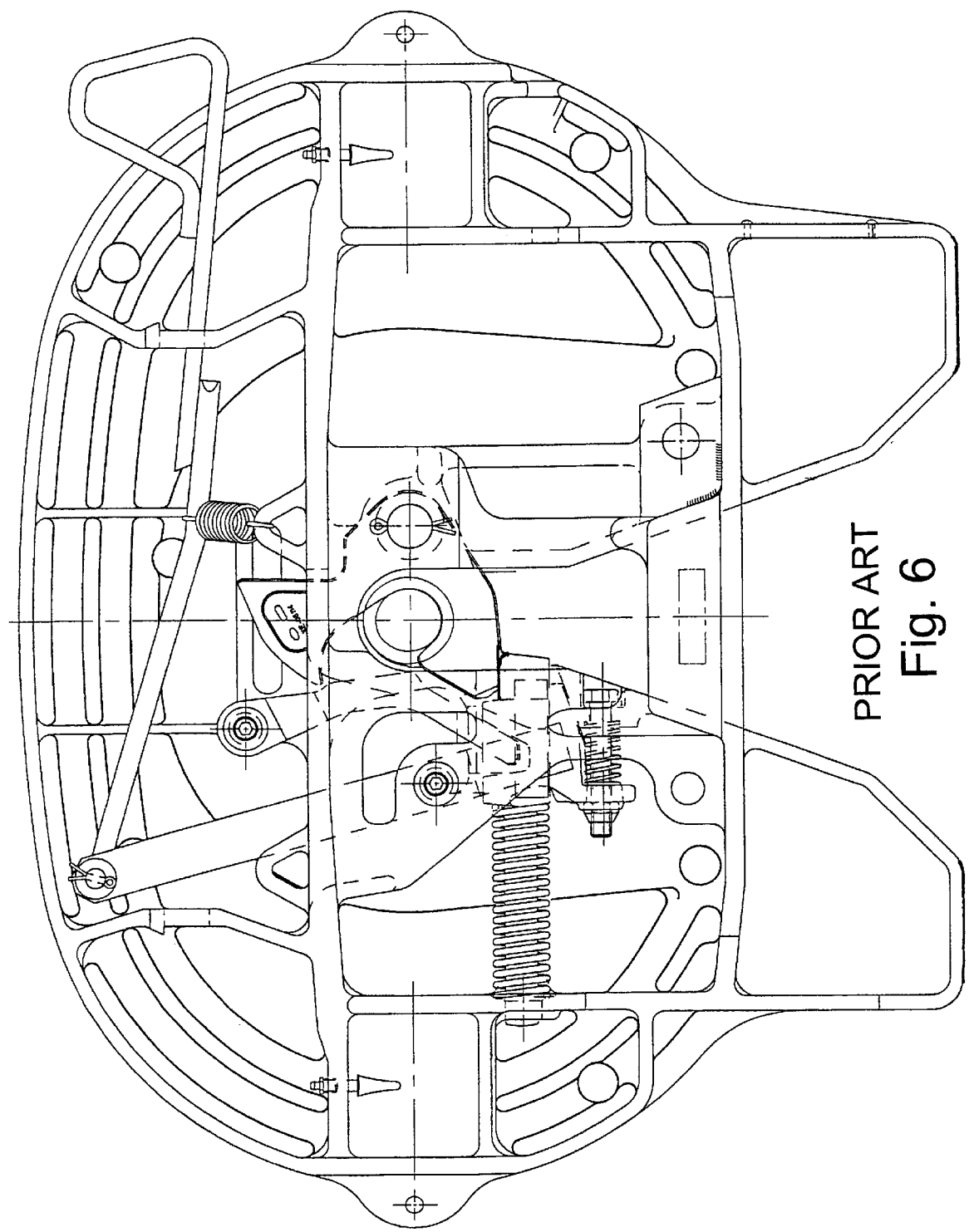
FIG. 6 is a bottom view of a prior art hitch.

Referring now specifically to the drawings, the fifth wheel hitch 10 there depicted includes a top plate 12 of generally conventional type, having a convex forward end and a bifurcated rear, as well as a pair of laterally spaced trunnions 14 for pivotally mounting the top plate and thereby enabling it to tilt from the true horizontal but remain in a generally horizontal orientation, in conventional manner. In FIG. 1 is illustrated the bottom of the top plate which includes a plurality of downwardly protruding transverse and fore-to-aft flanges 16, 18, 20 and 21 which rigidify the hitch and also support and cooperate with other components in a manner to be described hereinafter. The top surface of top plate 12 is a slide surface for engagement of a conventional semi-trailer. The rear end of plate 12 has bifurcated portions 24 which define therebetween a tapered forwardly extending convergent mouth 26 narrowing forwardly toward the center of the hitch, and terminating in a dead-end throat 28 to receive a kingpin. A kingpin is mounted on the undersurface of the forward end of a semitrailer in conventional fashion to cooperate with the fifth wheel hitch mounted on a truck tractor.

Adjacent throat 28 is a generally U-shaped or V-shaped swing jaw 30 pivotally mounted at its apex to a vertical pivot pin 32 fixed to plate 12, and laterally offset from the dead-end throat 28 extending from the apex are two integral jaw branches 30a and 30b. Branch 30b is a locking branch, while branch 30a may be designated a camming branch. Branch 30b of jaw 30 is generally rearwardly of the vertical axis of pivot pin 32, while branch 30a is generally forwardly of this axis except in the fully open position of the swing jaw. Swing jaw 30 pivots on pin 32 between a closed lock position across the throat as shown in FIG. 1 and behind a kingpin and a fully open position out of the throat of the hitch to allow movement of the kingpin into or out of the hitch. Swing jaw 30 has a concave recess to cooperate with the concave forward end of throat 28 to thereby cylindrically surround the neck or shoulder of a kingpin.

Jaw branch 30b has a specially configured lock plunger-engagement surface area on its outer, i.e., rear, surface. This cooperates with a locking plunger 40. Locking plunger 40 is laterally reciprocal into a retracted condition against the bias of a compression coil spring 42. Spring 42 is around the shaft of the plunger, between the plunger head and plate flange 20. The lock plunger is specially configurated where it is to engage with the swing jaw rear 20 surface area, as will be explained. Spring 42 biases the locking plunger toward the fully extended locking condition preventing rearward movement of the swing jaw.

The locking plunger has an adjustment wedge mechanism for adjusting the forward-rearward position of the locking plunger, to accommodate wear of the jaw elements and/or kingpin. This wedging mechanism includes a fixed wedge 52 having a diagonally sloping forward surface, and a laterally movable wedge 46 having a diagonally sloping rearward wedging surface engaging the forward wedging surface of fixed wedge 52. Movable wedge 46 is biased by compression coil spring 44 laterally outwardly of fixed wedge 52 for less wedging effect, but can be forcefully moved laterally inwardly of the fixed wedge for greater wedging effect, by adjusting nut 50 on stud 48. Nut 50 bears against the outer surface of the rearwardly extending leg of the L-shaped movable wedge element 46. Tightening of nut 50 on stud 48 moves wedge element 46 laterally toward mouth 26 of the hitch, thereby causing this movable wedge element to move forwardly toward throat 28 as wedge 46 slides against fixed wedge element 52. This forward movement increases the wedging effect to thereby move locking plunger 40 forwardly toward swing jaw 30 such that branch 30b is moved forwardly toward the kingpin in throat 28.

As will be understood, overadjustment of this wedge mechanism can move locking plunger 40 too far forwardly toward the hitch throat so it will not fully engage behind the closed swing jaw 30, but rather will abut the nose 33 of the swing jaw rather than sliding in behind the swing jaw. The present invention is intended to assist kingpin locking in those conditions, as will be described.

A conventional hitch release arm or lever 54 is pivotally mounted on vertical pin 56 to top plate 12 for manually releasing the hitch. This release arm extends through a slot in plunger 40 such that retraction of plunger 40 occurs with pivoting of release arm 54 in one direction, and extension of plunger 40 occurs with pivoting of release arm 54 in the opposite direction. In the illustrated embodiment, the unit is a so-called "left-handed" unit, and thus the release handle 58 is pivotally mounted between its ends to plate 12. The invention will be described relative to this model. If a "right-handed" unit is employed, release handle 58 would be pivotally mounted on its rearward end, i.e., beyond the plunger, so that in either version a pulling action on the release handle 58 will cause release arm 54 to pivot in the same way. These are equivalent arrangements well known in the trade. The forward end of release arm 54 is pivotally engaged at pin 55 to elongated release handle 58 which in turn extends laterally beyond the adjacent trunnion 14 for manual engagement of grip 60 on the outer end of the handle. Handle 58 extends out through a slot in flange 16. A coil spring 66 has one end attached to handle 58 and the opposite end attached to a fixed eyelet 13 of top plate 12. This tension spring 66 is capable of pulling handle 58 away from a locked position of the handle recess 58a on projection 16' of flange 16.

Also pivotally mounted to top plate 12 is an elongated cam arm 70 positioned between lock jaw element 30 and release arm 54. The forward end of this cam arm is pivotally mounted to plate 12 on pivot pin 72. Cam arm 70 has a generally dog-leg shaped configuration with a cam follower surface at the apex intermediate its ends, and has its rearward end projecting into a slot 40 in plunger 40. This cam may have a cooperative relationship with swing jaw 30, as well as the release arm and handle, all as set forth in U.S. Pat. No. 5,257,796 incorporated herein by reference.

The rear surface of branch 30b of swing jaw 30 is specially configured to have a plurality of steps, preferably two, i.e., a first rear surface portion or step 30' toward the outer end of branch 30b, and a second rear surface portion or step 30" rearwardly offset from the first rear surface portion 30', and laterally inwardly of the first step. In cooperation with these two jaw surface steps is a complementarily configured, front surface of the adjacent outer end of plunger 40, as noted in FIGS. 1 and 2. More specifically, the plunger front surface includes a first front surface portion or step 40' and a second front surface portion or step 40" rearwardly offset from step 40' and inwardly of the first step 40' relative to the hitch. During the full locking function, the first step 30' of jaw 30 is engaged by the first front surface step 40' of plunger 40, while the second jaw surface step 30" is engaged by the second plunger surface step 40". In use of the hitch, eventually wear occurs, usually on the fixed jaw end or swing jaw of the hitch assembly, and perhaps even on the kingpin interconnected with the hitch. This wear causes a certain amount of sloppiness or play between the kingpin and hitch. In order to keep that play or lost motion to a reasonable amount, lock plunger 40 is adjusted forwardly of the hitch by rotating nut 50 on fixed stud 48 to shift movable wedge element 46 inwardly such that its rear sloped surface travels further up the front sloped surface of fixed wedge element 52 causing wedge 46 to move forwardly of the hitch to shift plunger 40 forwardly toward jaw 30. However, if the wedge mechanism is overly adjusted, so that plunger 40 is shifted too far forwardly by the wedge, so the plunger cannot move fully behind jaw 30, still the second front step 40" of plunger 40 will engage the first rear step 30' of jaw 30 to hold jaw 30 closed. If the truck tractor pulls the semitrailer forwardly, the driver would notice the significant amount of lost motion or play between the kingpin and hitch so as to be alerted that the hitch is to be inspected by someone knowledgeable in adjusting the mechanism.

During the hookup operation, i.e., hitching motion, the entering kingpin engages the back side 35 of branch 30a, rotating swing jaw 30 about its pivot pin, simultaneously causing cam surface 31' to move along cam follower surface 70' on cam arm 70. As this occurs, the nose 33 of branch 30b engages the end of plunger 40 to give it a slight further retraction by pushing it laterally, following which the nose of branch 30b moves past the plunger allowing the properly adjusted plunger to slam into its fully extended locking condition depicted in FIG. 1. When this occurs, the two step forward face of plunger 40 fully engages the two step rearward face of swing jaw 30 in the manner depicted in FIGS. 1 and 2.

However, if the wedge adjustment mechanism has been overly adjusted so the plunger cannot be fully engaged behind the double surface of the swing jaw, at least the second rearwardmost step 40" of plunger 40 can engage behind the first forwardmost step 30' of swing jaw 30 to hold the jaw, and thus the lock, in closed condition. Forward movement by the truck tractor to pull the trailer will keep the trailer in tow but will result in the driver feeling a distinct bumping action between the hitch and the kingpin, informing him that there is excessive play between the kingpin and hitch jaws. He then will know that he should have a knowledgeable mechanic check the hitch to see what is causing the play. The mechanic, upon noting the interengagement relationship between the plunger and swing jaw, will realize he must back off the adjustment by rotating nut 50 rearwardly so that compression coil spring 44 will shift wedging element 46 laterally outwardly, such that its less pronounced interengagement with wedge element 52 will allow plunger 40 to move rearwardly to its appropriate location, allowing the plunger to be fully shifted with its two step front face fully engaging the two step rear face of swing jaw 30.

To unhitch the mechanism from a condition in which plunger 40 is in full engagement with the swing jaw biased by compression spring 42, thereby retaining the fifth wheel in locked relationship with the kingpin, the operator manually grasps grip 60 and pulls release handle 58 laterally to an extended condition, and then preferably shifts release handle 58 toward the front of the hitch to engage handle notch 58a with projection 16' on flange 16. This pulling action pivots release arm 54 about its pivot pin 56, thereby retracting plunger 40 from throat 28 of the fifth wheel hitch top plate, against the bias of compression coil spring 42. The truck tractor then can begin to move away from the trailer and kingpin, to withdraw the upwardly oriented fifth wheel hitch from the depending kingpin on the trailer. The kingpin in this movement pivots lock element 30 about its pivot pin 32 which in turn causes cam surface 31 on branch 30a to engage cam follower surface 70' on cam arm 70, causing the rearward end of cam arm 70 to retract plunger 40 a small additional amount against its coil spring, and to shift release arm 54 about its pivot pin, and shift release handle 58 axially to somewhat further extend its position, causing release of notch 58a from projection 16'. This allows spring 66 to pull release handle 58 rearwardly, disengaging it from flange 16. When the lock is fully open, the kingpin is released. The over center position of cam surface 30' of jaw 30 relative to cam arm 70, and specifically surface 70' thereof, causes the lock to remain fully open and not accidentally close, so another entering kingpin during attempted hookup will not damage a closed swing jaw, but rather will allow smooth hookup.

The above description is considered that of the preferred embodiments only. Modifications of the invention will occur to those skilled in the art and to those who make or use the invention. Therefore, it is understood that the embodiment shown in the drawings and described above is merely for illustrative purposes and not intended to limit the scope of the invention, which is defined by the following claims as interpreted according to the principles of patent law, including the doctrine of equivalents.

The invention claimed is:

1. A fifth wheel hitch comprising:

a top plate having a bifurcated rear forming a pair of rearwardly extending potions astraddle a tapered entering mouth and a dead-end throat for receiving a cooperative kingpin;

a hinged jaw adjacent said throat, pivotally mounted to said top plate and pivotal between a closed position across said throat and an open position clear of said throat;

said jaw having a rear surface for engagement by a locking plunger;

a locking plunger having a front abutment surface, and being shiftable between a retracted unlocking position out of engagement with said jaw, and an extended fully locking position behind said jaw and with said abutment surface engageable with said jaw rear surface, said locking plunger being spring biased toward said locking position;

wedge mechanism engaging said locking plunger for adjusting the forward-rearward position of said locking plunger to accommodate wear of said jaw;

said wedge mechanism having a fixed wedge element with a forwardly sloped wedge surface, a movable wedge element having a rearwardly sloped wedge surface engaging said forwardly sloped wedge surface, and an adjuster for said movable wedge element relative to said fixed wedge element to thereby control the forward position of said movable wedge element;

said jaw rear surface having a first rear surface portion and a second rear surface portion rearwardly offset from said first rear surface portion;

said plunger abutment surface having a first front surface portion and a second front surface portion rearwardly offset from said first front surface portion;

said first and second rear surface portions of said jaw being engageable with said respective first and second front surface portions of said plunger in full locking engagement of said locking plunger with said jaw, and said first front surface portion of said plunger being engageable with said second rear surface portion of said jaw if said plunger cannot shift to full locking engagement due to overadjustment of said wedge mechanism.

2. A fifth wheel hitch comprising:

a top plate having a bifurcated rear forming a pair of rearwardly extending portions astraddle a tapered entering mouth and a dead-end throat for receiving a cooperative kingpin;

a hinged jaw adjacent said throat, pivotally mounted to said top plate and pivotal between a closed position across said throat and an open position clear of said throat;

said jaw having a rear surface for engagement by a locking plunger;

a locking plunger having a front abutment surface, and being shiftable between a retracted unlocking position out of engagement with said jaw, and an extended fully locking position with said abutment surface engageable with said jaw rear surface, said locking plunger being spring biased toward said locking position;

wedge mechanism engaging said locking plunger for adjusting the forward-rearward position of said locking plunger to accommodate wear of said jaw;

said wedge mechanism having a fixed wedge element with a forwardly sloped wedge surface, a movable wedge element having a rearwardly sloped wedge surface engaging said forwardly sloped wedge surface, and an adjuster for said movable wedge element;

said locking plunger having a plurality of front surface portions rearwardly offset relative to each other;

said hinged jaw having a plurality of rear surface portions rearwardly offset relative to each other;

said plunger front surface portions and said jaw rear surface portions being configured to form a complementary interfit upon full locking engagement of said plunger with said jaw, and to partially interfit if said plunger is overly adjusted by said wedge mechanism.

3. A fifth wheel hitch comprising:

a top plate having a bifurcated rear forming a pair of rearwardly extending portions astraddle a tapered entering mouth and a dead-end throat for receiving a cooperative kingpin;

a hinged jaw adjacent said throat, pivotally mounted to said top plate and pivotal between a closed position across said throat and an open position clear of said throat;

said jaw having a rearward surface for engagement by a locking plunger;

a locking plunger having a forward abutment surface, and being shiftable between a retracted unlocking position out of engagement with said jaw, and an extended fully locking position with said abutment surface engageable with said jaw rearward surface, said locking plunger being spring biased toward said locking position;

wedge mechanism engaging said locking plunger for adjusting the forward-rearward position of said locking plunger to accommodate wear of said jaw;

said locking plunger having a plurality of laterally adjacent front surface portions rearwardly offset relative to each other;

said hinged jaw having a plurality of laterally adjacent rear surface portions rearwardly offset relative to each other;

said plunger front surface portions and said jaw rear surface portions being configured to form a complementary interfit upon full locking engagement of said plunger with said jaw, and to partially interfit if said plunger is overly adjusted by said wedge mechanism.

4. The fifth wheel hitch in claim 3 wherein said plunger front surface portions are rearwardly offset in steps laterally inwardly of said hitch, and said jaw rear surface portions are also rearwardly offset in steps laterally inwardly of said hitch.

5. The fifth wheel hitch in claim 4 wherein there are two front surface steps and two rear surface steps.

* * * * *

UNITED STATES PATENT AND TRADEMARK OFFICE
CERTIFICATE OF CORRECTION

PATENT NO. : 6,179,316 B1
DATED : January 30, 2001
INVENTOR(S) : Richard J. Sibley, Jr.

It is certified that error appears in the above-identified patent and that said Letters Patent is hereby corrected as shown below:

Column 1,
Line 52, after "may" insert -- drop. --.

Column 4,
Line 30, "40" should be -- 40a --.

Column 5,
Line 6, "31" should be -- 31 --.

Signed and Sealed this

Thirteenth Day of November, 2001

Attest:

NICHOLAS P. GODICI
Attesting Officer
Acting Director of the United States Patent and Trademark Office